No. 627,673. Patented June 27, 1899.
D. McDONALD.
PIPE JOINT.
(Application filed June 6, 1898.)
(No Model.)
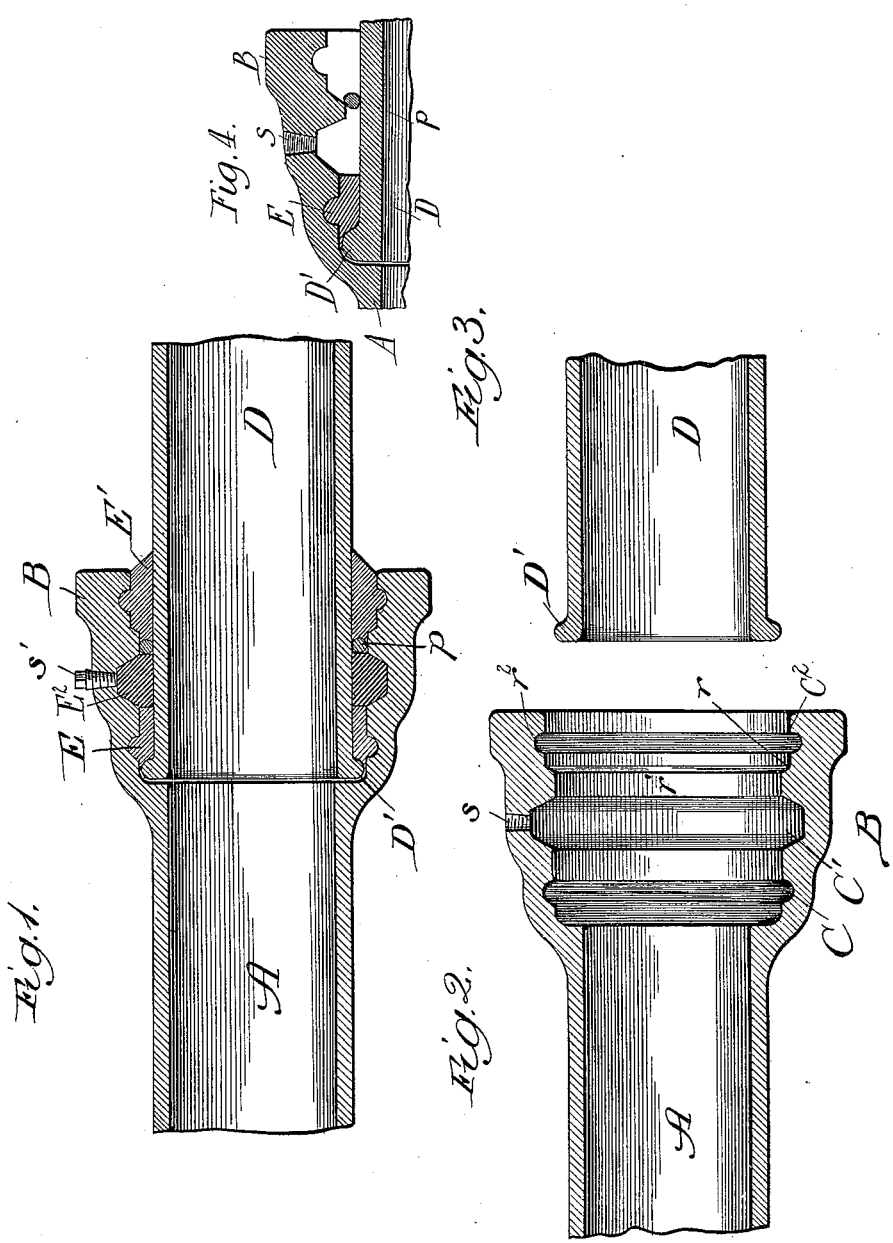
Witnesses:
Inventor:
Donald McDonald,
By Dyrenforth & Dyrenforth,
Attys

UNITED STATES PATENT OFFICE.

DONALD McDONALD, OF LOUISVILLE, KENTUCKY.

PIPE-JOINT.

SPECIFICATION forming part of Letters Patent No. 627,673, dated June 27, 1899.

Application filed June 6, 1898. Serial No. 682,745. (No model.)

*To all whom it may concern:*

Be it known that I, DONALD McDONALD, a citizen of the United States, residing at Louisville, in the county of Jefferson and State of Kentucky, have invented a new and useful Improvement in Pipe-Joints, of which the following is a specification.

My invention relates to an improvement in pipe-joints of the type known as "spigot-joints," wherein the bell or bowl shaped end of one pipe-section receives the spigot end of the adjacent pipe-section and a suitable packing is interposed at the joint to prevent leakage.

The object of my invention is to provide an improved construction for joints of this nature whereby the pipes may be quickly and easily joined and the joints be rendered fluid-tight and capable of withstanding heavy pressure while possessing the requisite flexibility to enable the pipe to accommodate itself to unavoidable irregular settling.

In the accompanying drawings, Figure 1 is a sectional view of a pipe-joint embodying my invention; Fig. 2, a broken section of the bell end of a pipe-section; Fig. 3, a broken section of the spigot end of a pipe-section, and Fig. 4 an enlarged detailed view showing clearly the location of an annular rope gasket or packing employed.

A represents a pipe-section provided with a bell or bowl B, preferably of a depth slightly greater than the bowls on pipes of ordinary construction. The bell is provided interiorly with annular channels C, C', and $C^2$, the central one, C', of which possesses considerable depth and communicates with the exterior of the bell through a transverse perforation $s$, which receives a preferably threaded plug $s'$. The channel $C^2$ preferably extends in width from the outer end of the bell, which is thereby enlarged, to an annular shoulder $r$, which forms one side of an annular rib $r'$, which separates the channels C' and $C^2$. The channel $C^2$ is itself provided with an annular groove $r^2$, which serves as a retaining means for the outer filling, hereinafter described.

D is the spigot end of the adjoining pipe-section, provided at its end margin with a simple enlargement or annular ridge D'.

E and E' are inner and outer circlets, respectively, of any suitable material capable of confining between them a central filling $E^2$ of melted pitch or other material possessing the requisite qualities of plasticity and a moderately low melting-point, permitting it to be introduced at a raised temperature as a liquid through the perforation $s$, after which it regains a sufficiently-set form or non-fluid state to prevent its leakage past the packings E and E', but remains in a sufficiently yielding or plastic state to permit some movement in the joint without causing a leak.

The circlet E preferably is of lead cast or wrapped about the pipe D close to the enlargement D' and tamped in by means of a calking-chisel till an annular bead is formed on it which fills the inner retaining-groove C.

The circlet E' preferably is of cement, which adds greatly to the strength of the joint, though it may be of lead or other suitable material. Where the circlet E' is of cement, a pitched rope $p$ may be introduced between the annular rib $r'$ and the pipe D and the cement pressed against this packing and allowed to set, after which the melted pitch may be poured into the channel C' and the plug inserted. Another method is to substitute for the pitch-soaked rope $p$ a piece of rubber hose which serves to confine the melted pitch until after it has cooled, after which the hose is withdrawn and the cement pressed in against the pitch filling.

Fig. 4 shows the pitched rope as being entered beneath the annular rib $r'$. The rope may be left in this position, or it may be wedged completely beneath the rib, as shown in Fig. 3.

In practice I find it very essential that the annular recess C' and that portion of the pipe D with which the melted pitch contacts be coated or painted with some binding material, such as pitch dissolved in benzol. The reason for this step is that hot pitch will not adhere to cold iron, but will unite with the pitch applied as just stated, so as to form a gas-tight joint.

It should be stated that the object of the packings flanking the annular channel C' is to afford means for confining the melted pitch till the latter becomes cool and to give a certain requisite strength and rigidity to the joint. Accordingly such materials may be used for these packings as will serve to accomplish these ends. On the other hand, the object of the pitch filling E² is to make the joint gas or liquid tight and by its plasticity to prevent leakage even though a settling of the pipes should loosen the lead and cement fillings to such a degree as to allow leakage were it not for the pitch filling. Accordingly such material may be used for the filling E² as will accomplish the desired object, though care should be taken to select a material which is not readily soluble in the gas or liquid passing through the pipe-line. Thus rosin, tallow, paraffin, white lead, or the like, which may be readily introduced into the recess in liquid form and allowed to settle into a plastic state, after which it cannot escape from the joint, may be employed for this filling.

I deem it of very great importance that the filling E² shall not only fill the space between the packings E and E', but also shall project into an annular recess provided for the purpose on the internal surface of the bell. With the annular recess C' omitted it is almost, if not quite, impossible to prevent gas escaping along the outer surface of the filling. The reason for this is that, so far as I am able to judge, the material naturally binds the encircled pipe closely, and any shrinkage would first be noticeable at the contact with the bell and not at the contact with the inner pipe. With the pitch filling the annular recess C' if any gap occurs it will be at the outer surface of the pitch, and an accumulation of pressure at this surface would force the pitch into close contact with the sides of the annular channel, thus insuring a tight joint. In the event that no filling for the recess C' can be obtained which will be free from the action of the particular fluid being conveyed then some suitable insoluble material—such as cement, powdered asbestos, or the like—is mixed with the filling to be set free by the first dissolving action and stop up the crevice by which the liquid has entered, such liquid as is entrapped being saturated, and so incapable of further damage.

The manner of joining the pipes is to introduce the spigot end into the bell end, tamp the lead filling E into place, insert a packing between the annular rib $r'$ and the pipe D, and then fill in the cement E', if the packing $p$ is to remain, after which the pitch is poured in at the perforation $s$ and the plug $s'$ inserted, or, if the packing $p$ is to be removed, to pour in the pitch before the cement is added, allow it to cool, and then withdraw the packing $p$ before introducing the cement packing E'.

The filling E, it will be observed, engages both the annular recess C of the bell and the flange D' of the spigot end and effectually holds the spigot end against withdrawal.

I am aware that a spigot-joint has been formed heretofore wherein a liquid has been introduced between the annular fillings confined between the bell and spigot ends; but such a joint is distinguished from the present invention in that the confined liquid is of a nature to escape whenever a leak occurs at either of the confining packings, thereby serving as a means for indicating a leak, but not for preventing one. Such a construction further differs from the present one in that the bell is not provided with the annular recess C', here shown and deemed a most important feature of the invention.

What I claim as new, and desire to secure by Letters Patent, is—

1. In a pipe-joint, the combination of a pipe-section provided with a bell having an internal annular recess and an intersecting transverse perforation leading to the exterior of the bell, a pipe-section provided with a spigot end projecting into said bell, annular packings flanking said annular recess, and a filling of pitch or other plastic material between said packings and in said annular recess, said filling being of a nature to permit its introduction through said perforation but to be retained by said packings, substantially as and for the purpose set forth.

2. In a pipe-joint, the combination of a pipe-section provided with a bell having three internal annular recesses and a transversely-extending perforation intersecting the central recess and leading to the exterior of the bell, a pipe-section provided with an enlarged end projecting into said bell, packing for the inner and outer recesses, and a filling of pitch or other plastic material in said central recess, said filling being of a nature to permit its introduction through said perforation but to be retained by said packing, substantially as and for the purpose set forth.

3. In a pipe-joint, the combination of a pipe-section provided with a bell having on its interior a central annular recess communicating with the exterior by means of a transversely-extending intersecting perforation and having also annular recesses flanking the central recess, a pipe-section provided at its end margin with an annular enlargement and projecting into said bell, a lead packing at the inner one of said recesses forming an annulus on the inner pipe preventing the withdrawal of the inner pipe, a cement packing at the outer recess, and a filling of pitch or other plastic material at the central recess, said central filling being of a nature to permit it to be introduced through said perforation and then assume a sufficiently non-fluid state to prevent its escape from the joint, substantially as and for the purpose set forth.

4. In a pipe-joint, the combination of a pipe-section provided with a bell having an internal annular recess C' communicating by means of a transversely-extending intersecting perforation with the exterior of the bell and an annular recess at the outer end of the bell, said recesses being separated by an annular rib, a pipe-section provided with a spigot end projecting into said bell, a packing at the inner side of the recess C', a packing of pitched rope or the like between said annular rib and the inner pipe, a packing of cement or the like in the outer recess, a filling of pitch or the like in the recess C' and means for closing the perforation through which the pitch is introduced, substantially as and for the purpose set forth.

DONALD McDONALD.

In presence of—
　WM. H. CRUTCHER,
　LILLIE M. DUNCAN.